Patented Aug. 24, 1943

2,327,570

UNITED STATES PATENT OFFICE 2,327,570

METHOD OF MAKING METALDEHYDE

Willard L. Vogel, Los Angeles, Calif., assignor of fifty per cent to Paul W. Prutzman, Los Angeles, Calif.

No Drawing. Application October 19, 1940, Serial No. 361,944

4 Claims. (Cl. 260—340)

The substance described under the name "metaldehyde" is one of the polymerides of acetaldehyde (CH$_3$CHO), the latter being commonly known and being referred to herein as "aldehyde." Metaldehyde is a colorless, crystalline solid which is usually assigned the formula (C$_2$H$_4$O)$_4$, on the basis of the characteristics of its solutions in phenol, although its solutions in some other solvents have characteristics inconsistent with this formula. The structural formula for the substance has never been derived. The material has various technical uses, particularly as a snail poison.

In the methods of manufacturing metaldehyde heretofore described it has been necessary to start with substantially pure aldehyde, which is polymerized to metaldehyde by the action of an acid (usually H$_2$SO$_4$) at very low temperatures. If the acid is applied to the aldehyde at normal temperatures, a different polymeride, paraldehyde (C$_2$H$_4$O)$_3$, which is a liquid product having different properties and uses, is formed in a vigorous, strongly exothermic reaction.

I have discovered that metaldehyde may be produced from cheap or valueless raw materials by so modifying the prior art methods as to take advantage of certain peculiarities in the solubilities of the solid polymer. These raw materials are, for example, the "singlings" or first runnings obtained in the distillation of ethanol from fermented molasses and the condensate obtained from the vapor recovery systems now generally applied to wine storage tanks. These liquids consist mainly of alcohol but contain on the average 7% to 14% of aldehyde which can be separated completely only with considerable difficulty and expense. For this reason they are substantially waste products and sometimes noxious wastes, and are unsuited for use as raw materials in the prior art methods.

In utilizing these low grade materials I may operate either without or with a preliminary concentration of the aldehyde content.

In operating without the concentration step, I add to the dilute solution of aldehyde in ethanol a considerable volume of a weak acid, such as diluted (5%) acetic acid solution in water or highly diluted sulfuric acid. I then reduce the temperature into a range from 25° F. to 0° F. and allow the batch to stand for at least an hour, preferably about two hours. No precipitation occurs under these conditions, but on the addition of large volumes of cold water, maintaining the bath at not over 35° F., metaldehyde separates as a flocculent or granular precipitate which may be recovered by filtration or the like, water-washed, and finally dried on a filter through which cold air is passed. The precipitate is likely to become gummy and unfilterable unless maintained at a low temperature.

The yield of metaldehyde obtained at this point in the process is only moderately favorable; however, by further treatment of the liquid which remains additional quantities of metaldehyde may be obtained. Upon being allowed to stand for a short period of time, this liquid separates into an aqueous body (consisting of water, alcohol, acid, and a small proportion of unchanged aldehyde) and an oily, supernatant layer consisting substantially of paraldehyde. I separate this supernatant liquid, without any particular care to avoid taking some of the aqueous material with it, and then add to it a dilute, aqueous solution of a mild alkali, preferably NaHCO$_3$, in amount sufficient to neutralize any acid present and to leave the material somewhat alkaline. During these steps the temperature is permitted to rise to a normal level, perhaps 80° F. The alkaline mixture is agitated strongly for a short period of time and then chilled to about 35° F. or lower. When the low temperature is reached a second precipitation of metaldehyde occurs, and the precipitate may be recovered, washed, and dried as above. If desired, the above-mentioned aqueous body may be distilled to recover ethanol of low aldehyde content.

The yield of metaldehyde may be improved by concentrating the aldehyde content of the original raw material, as by adding water to the singlings and rectifying in an efficient fractionating column. This distillation should be so controlled as to yield an alcohol-aldehyde mixture containing not less than 45% by weight of aldehyde, and 50% is preferred. There is no object in raising the aldehyde content above 75%.

To this aldehyde solution in alcohol I add a somewhat diluted sulfuric acid, preferably not over 50% acid concentration, reducing the temperature of the bath to about 35° F. Polymerization takes place slowly but is hastened by the addition of a solid, anhydrous metallic chloride such as calcium chloride or zinc chloride. If the temperature is allowed to rise above the figure stated, the polymerization is likely to run wild and produce the liquid instead of the solid polymer.

After sufficient time, which may be from ten minutes to two hours, depending on the aldehyde concentration and the quantity of water present, polymerization is complete but the solid product remains in solution in the alcohol. But on the addition of about two volumes of ice water, the metaldehyde is thrown out in the solid form and may be purified by washing and drying as above described. The yield of metaldehyde by this step is much higher than the yield of the similar step practiced upon unconcentrated singlings, and under ideal conditions it closely approaches the theoretical. Ordinarily, however, some of the aldehyde is converted to paraldehyde, which may be separated and treated with alkali as above.

It appears that there is no practical object in fractionating the aldehyde-alcohol mixture to a higher aldehyde content than about 50%, but I have so far been unable to obtain from alcohol-aldehyde solutions containing less than 45% aldehyde sufficiently improved yields of the solid polymer to justify the concentration step.

I claim as my invention:

1. The method of producing metaldehyde which comprises: treating an alcoholic solution of acetaldehyde with a dilute acid to polymerize the aldehyde content of said solution; maintaining a temperature of 0° to 35° F. during said polymerization to restrain the formation of paraldehyde; adding a relatively large volume of cold water to the reacted solution; separating from the aqueous mixture precipitated metaldehyde and a supernatant paraldehydic fraction; agitating said paraldehydic fraction with an aqueous, mildly alkaline solution at normal temperature; cooling the treated paraldehydic fraction to 35° F.; and separating precipitated metaldehyde from the cold, alkaline product.

2. The method of producing metaldehyde which comprises: treating an alcoholic solution of acetaldehyde with a dilute acid to polymerize the aldehyde content of said solution; maintaining a temperature of 0° to 35° F. during said polymerization to restrain the formation of paraldehyde; and finally precipitating the solid metaldehyde from alcoholic solution by adding a relatively large volume of cold water thereto.

3. The method of producing metaldehyde which comprises: treating an alcoholic solution of acetaldehyde containing not less than 45% by weight of the aldehyde with an aqueous solution of sulfuric acid containing not more than 50% by weight of the acid to polymerize the aldehyde content of first said solution; maintaining a temperature not greater than 35° F. during said polymerization; and finally precipitating the solid metaldehyde from alcoholic solution by adding a relatively large volume of cold water thereto.

4. A method as and for the purpose set forth in claim 3, in which the polymerization with acid is conducted in the presence of a solid anhydrous metallic salt.

WILLARD L. VOGEL.